Figure 1:
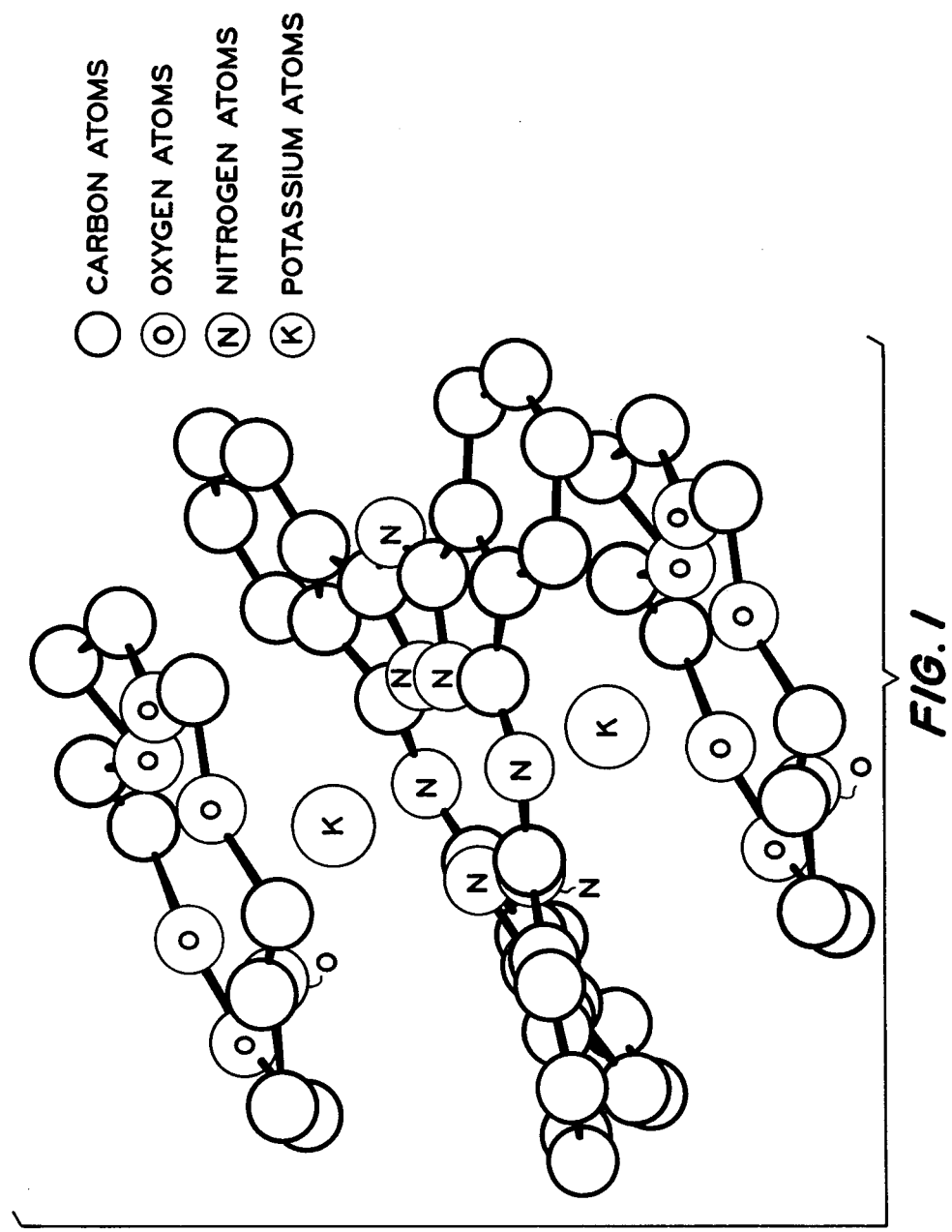

United States Patent [19]

Gunther

[11] 4,197,242
[45] Apr. 8, 1980

[54] POTASSIUM PHTHALOCYANINE COMPLEXES, METHOD OF PREPARATION, AND PHTHALOCYANINE PURIFICATION PROCESSES

[75] Inventor: Wolfgang H. H. Gunther, Webster, N.Y.

[73] Assignee: Xerox Corporation, Stamford, Conn.

[21] Appl. No.: 921,288

[22] Filed: Jul. 3, 1978

[51] Int. Cl.$^2$ .................. C09B 47/04; C09B 47/08
[52] U.S. Cl. ................................................. 260/314.5
[58] Field of Search ...................................... 260/314.5

[56] References Cited

U.S. PATENT DOCUMENTS

| | | | |
|---|---|---|---|
| 2,741,531 | 4/1956 | Pedersen | 260/314.5 |
| 2,982,666 | 5/1961 | Chun et al. | 260/314.5 |
| 3,357,989 | 12/1967 | Byrne et al. | 260/314.5 |
| 3,492,309 | 1/1970 | Ossanna | 260/314.5 |
| 3,562,295 | 2/1971 | Pedersen | 260/314.5 |
| 3,932,454 | 1/1976 | Luebbe, Jr. | 260/314.5 |

*Primary Examiner*—Henry R. Jiles
*Assistant Examiner*—Natalia Harkaway
*Attorney, Agent, or Firm*—J. J. Ralabate; A. A. Mahassel; E. O. Palazzo

[57] ABSTRACT

The invention of this application is directed to dipotassium phthalocyanine glyme and crown ether complexes, such as for example dipotassium phthalocyanine bis (methoxy ethyl) ether and dipotassium phthalocyanine bis (18-crown-6) ether. Methods for obtaining these complexes by reacting metal free phthalocyanine with potassium hydroxide and the appropriate glyme or crown ethers in the presence of water is also described. Further methods for obtaining purified metal free phthalocyanines from the glyme and crown ether complexes are disclosed. These materials have many uses including pigments, electrophotographic photoreceptors and photoreceptor devices.

5 Claims, 2 Drawing Figures

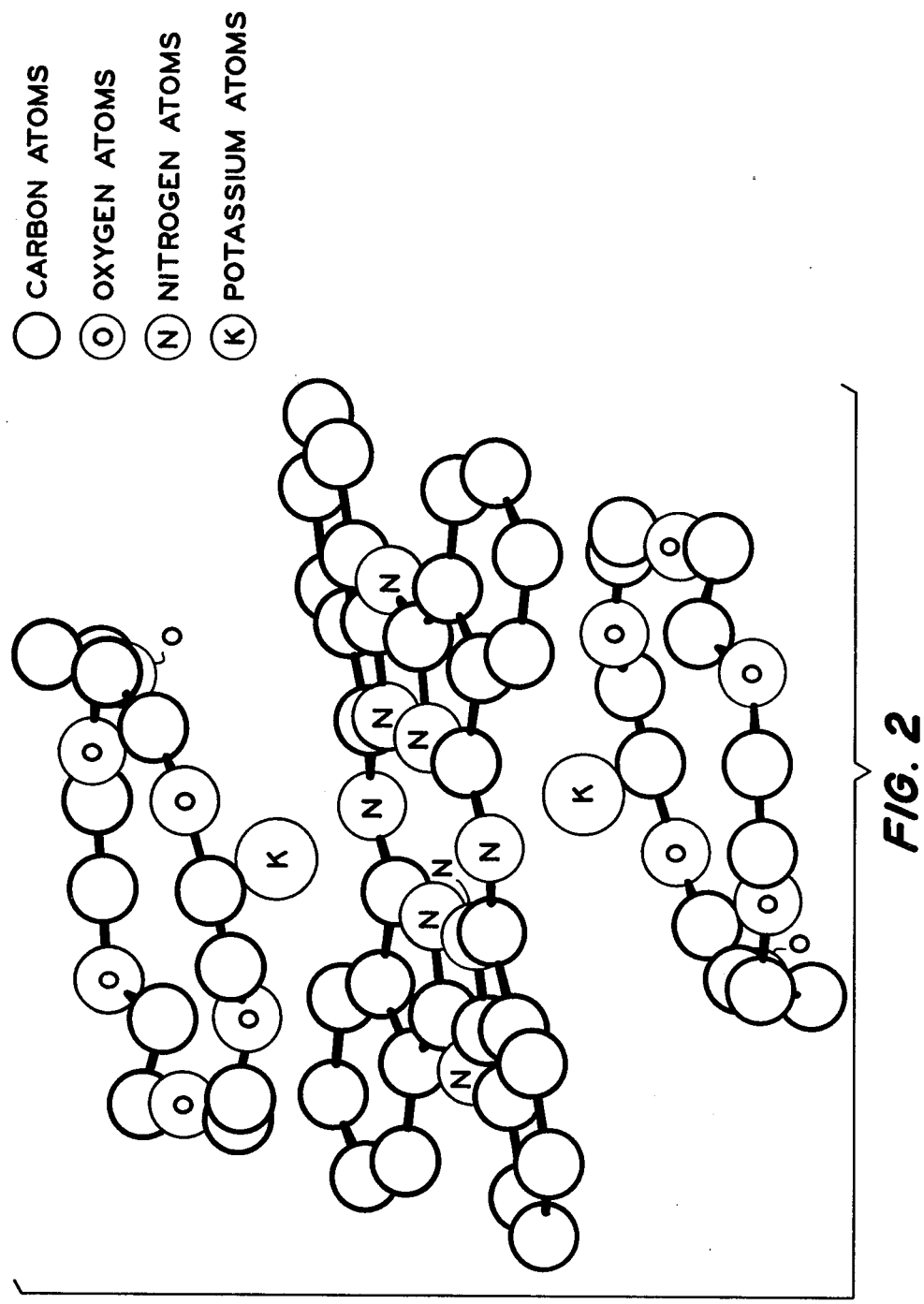

POTASSIUM PHTHALOCYANINE COMPLEXES, METHOD OF PREPARATION, AND PHTHALOCYANINE PURIFICATION PROCESSES

BACKGROUND OF THE INVENTION

This invention relates generally to highly purified metal free phthalocyanines, methods of preparation thereof, and soluble metal phthalocyanine complexes with polyethers such as glymes and crown ethers, potassium diglyme phthalocyanines and potassium phthalocyanines complexed with crown ethers and the complexation process with diglyme and crown ethers which is more specifically identified hereinafter as well as methods for interconverting metal free and alkali metal diglyme and crown either complexed phthalocyanines.

Metal free phthalocyanine has the basic structure of the following general formula as described in U.S. Pat. No. 3,357,989 fully incorporated herein by reference.

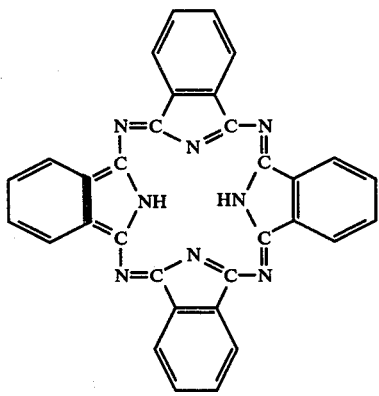

This species can be modified by substitution around the perimeter of the macrocyclic ring, as is well known in the art and the present invention applies to such molecularly substituted phthalocyanines as well as to the basic structure. Illustrative examples of such substituents include halogen, alkyl, nitro, naphthyl, and anthranyl.

Additionally, as described in the U.S. Pat. No. 3,357,989 referenced, it is known that the two hydrogen atoms in the center of the phthalocyanine molecule can be replaced by metals such as copper, for example. Phthalocyanine itself is known to exist in many crystal forms which forms can be distinguished by comparison of their X-ray diffraction pattern and/or infrared spectra. Further, the basic cyan/blue color of the phthalocyanine pigment varies within a range according to the polymorphic form. For example, the beta form is greener in color than the alpha or gamma forms. Various forms of phthalocyanine both metal containing and metal free, additional polymorphs, have been described, for example, in U.S. Pat. No. 3,051,721 (R-form), U.S. Pat. No. 3,160,635 (delta-form) and U.S. Pat. No. 3,150,150 (another delta-form), as well as U.S. Pat. No. 3,357,989 (an x-form phthalocyanine).

Phthalocyanines are prepared from simple molecules by a variety of methods known in the art. Generally, this involves reaction of a precursor containing the contiguous carbon skeleton

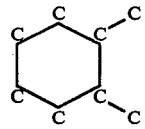

which either additionally contain nitrogen atoms or to which is externally supplied a source of such nitrogen atoms in a solvent in the presence or absence of catalysts or additional reagents at elevated temperature for varying amounts of time. The general result of such a synthetic procedure is a crude metal-free or metal-containing, substituted or unsubstituted phthalocyanine. Crude chemical products exhibit properties that combine the properties of the name-giving major constituent and those of the contaminants. Depending upon the desired use, the properties conferred upon the bulk chemical by its contaminants may be detrimental, beneficial, or irrelevant. Detrimental properties may be conferred by unknown constituents simply defined as having been created during the process of synthesis. Therefore, it is generally necessary to purify synthetic materials until properties with respect to a standard have been reached. For materials like phthalocyanine, it is then also necessary to obtain the correct polymorphic form in order to assure desired properties.

The main methods for purification of phthalocyanine methods for purification of phthalocyanine are illustrated in U.S. Pat. Nos. 3,357,989 and 2,741,531. The most widely method used today is as described in the '989 patent which method involves subjecting a mixture of alpha and beta metal free phthalocyanines commercially available from the Arnold Hoffman Company, a division of ICI Limited (Monolite Fast Blue GS) to solvent extraction with dichlorobenzene followed by washing with acetone and drying. The pigment is then subsequently dissolved in concentrated sulfuric acid and precipitated in ice and water followed by washing the precipitate with methanol and subsequently drying. This method, known in the art as the acid pasting method uses one of the few solvents that will cause the phthalocyanine pigment to be dissolved, namely concentrated sulfuric acid. However such acid pasting while useful with respect to gross purification for the pigment industry may introduce new impurities into the metal free phthalocyanine being prepared in view of the chemical reactions that are occurring unless specific reaction parameters such as time, temperature and the like are adhered to. Thus, acid pasted materials prepared show a great variance in properties that are most sensitive to small amounts of adventitious contaminants, such as the electrical or photoelectric properties.

It is significant to note that electrical properties of pigments may be influenced by quantities of contaminants that cannot be detected much less be identified by the usual analytical methods. In such a situation, a progressive change in electrical properties as a function of purification steps constitutes the only practical method for determining a change in materials purity.

Methods of purification for most organic compounds include dissolution/crystallization, dissolution/precipitation, extraction, zone refining, distillation, sublimation, and chromatography of various kinds. All these methods have in common that desired molecules are selectively accumulated in one place while undesired (and frequently unspecified) molecules are ommited from the accumulated material. The specific method chosen for a given material depends both on the properties of the main material and on those of the contaminants.

In U.S. Pat. No. 2,741,531, there is described a method for altering the physical state of metal free phthalocyanine pigments for the purpose of transforming such pigments from the solid state into the form of a solution which is not a metal free phthalocyanine pigment in an alocholic solvent with a strongly basic compound of alkali metal, for instance a hydroxide, alkoxide or hydride of sodium or potassium. This patent is primarily directed to a process for altering the state of phthalocyanine pigments for use in dying cellulosic fibers.

Phthalocyanines have a wide range of uses including uses as pigments and paint materials, textile dyestuffs and as photoconductors which are used in electrophotographic imaging systems. One form of phthalocyanine, namely copper phthalocyanine, is well known and is commercially used in oil paints, water paints, oil printing inks, rubber and textile printing inks. The primary utility of the phthalocyanines made in accordance with the present invention would be as a photoconductor in an electrophotographic imaging system and more specifically, as a layer in organic photoreceptor structure or as an organic photoconductor itself. In the layered organic photoreceptor, the phthalocyanine normally functions as a generating material, that is a material that generates both positive and negative charges, somewhat similar to a selenium layer that is commercially used in electrophotographic systems.

Phthalocyanine is a very complex material and difficulties have been encountered in isolating new forms of phthalocyanines as well as discovering methods for preparing such new forms which are simple and economically attractive. Additionally, those methods which are known for preparing phthalocyanine in most instances result in a phthalocyanine that contains impurities and such impurities can have an adverse effect on the particular phthalocyanine or derivative used, particularly when for example, it is employed in an electrophotographic environment. In view of its extremely low solubility in most solvents, very few known methods result in a purified phthalocyanine with the possible exception of the acid pasting method, and even that method produces phthalocyanines which contain some impurities. One of the difficulties encountered in the acid pasting method is that the reagent slowly destroys the molecule of phthalocyanine. This destruction is a function of time and temperature and an exact regimen of these parameters has to be adhered to, as indicated hereinbefore in order to produce material of reproducible properties. Also, it is generally accepted that the sulfuric acid used cannot be totally eliminated even after repeated washings with ammonia for example. Thus, sulfuric acid and various decomposition products of phthalocyanine are contained in the final product and such phthalocyanine has properties too variable to be workable in a reliable xerographic imaging system.

Accordingly, there is a need for new forms of phthalocyanine, methods of preparing such new forms and methods for obtaining purified phthalocyanines which would be useful as pigments, and particularly for electrophotographic systems. Further, there is a need for a method for the preparation of phthalocyanines which is economical, simple and direct and which method will offer predictability, that is, substantially the same results are achieved when repeating the method a number of times. Also, there is a need for a method which will cause the dissolving of the phthalocyanine which method uses more simple economical and less hazardous materials than sulfuric acid as is used in the prior art.

DESCRIPTION OF THE INVENTION

It is an object of this invention to provide new phthalocyanines and their methods of preparations which overcome the above noted deficiencies.

It is another object of this invention to provide metal free phthalocyanines which are useful in electrophotographic systems.

It yet another object of this invention to provide metal free phthalocyanines of high purity by a simple direct and economical method.

Another object of the present invention is to provide new phthalocyanines which may be used as reactants to form purified phthalocyanines or other forms of metal free phthalocyanines.

Another object of the present invention resides in a method for the preparation of metal free phthalocyanine of high purity and high yield which phthalocyanine would be useful as a photoconductor in electrophotographic imaging systems.

These and other objects of the present invention are accomplished by providing new phthalocyanine compositions and their methods of preparation; two of the phthalocyanine compositions being of the formulas as shown in FIGS. 1 and 2. The empirical formula for the dipotassium phthalocyanine bis diglyme composition is $C_{44}H_{44}N_8O_6K_2$ while the formula of the crown ether is generally $K_2$ phthalocyanine (crown)$_2$.3 benzene or $C_{65}H_{73}O_{12}N_8K_2$ (1.5 benzene). These phthalocyanines can be referred to generally as dipotassium phthalocyanine glyme and dipotassium crown ethers. FIG. 1 represents a two dimensional projection of a 3 dimensional dipotassium phthalocyanine diglymecomplex salt, while FIG. 2 represents a two dimensional projection of a three dimensional dipotassium (18-crown-6) ether complex salt.

The crown ethers are cyclic carbon oxygen compositions of structures such as

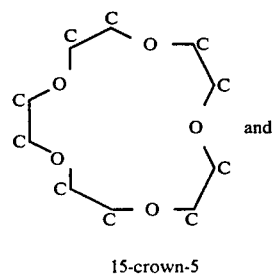

15-crown-5

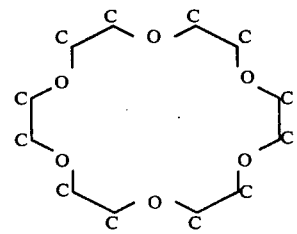

18-crown-6

The 15-crown-5 is named based on the total number of atoms of carbon and oxygen present (15) and the total number of oxygen atoms present (5), while the 18-crown-6 contains a total of 18 atoms, 6 of which are oxygen. The other crown ethers embraced within the present invention are named in the same manner.

Illustrative examples of compounds falling within the scope of the present invention include dipotassium phthalocyanine-bis-diglyme, dipotassium phthalocyanine tetraglyme, dipotassium phthalocyanine-bis-(18-crown-6) ether, dipotassium phthalocyanine bis-(15-crown-5) ether, dipotassium phthalocyanine-bis-(12-crown-4) ether and the like.

The phthalocyanine compounds of the present invention are useful as pigments and more specifically, the potassium diglyme and crown ether phthalocyanine compounds are useful as a reactant for the preparation of other chemical compounds especially metal free phthalocyanine. Additional uses for the potassium diglyme phthalocyanine and the crown ether phthalocyanines include solution deposition of phthalocyanine into fibers and into organic polymers or organic polymer fibers, the creation of extremely fine phthalocyanine pigment particles, (as the species is molecularly soluble and the solutions can be infinitely diluted), and the other uses mentioned hereinbefore.

Methods for preparing the above described potassium phthalocyanine diglyme complex which would also apply to the other phthalocyanine glyme compositions generally involves treatment of metal-free phthalocyanine with potassium hydroxide and bis(methoxyethyl) ether (also called diglyme) in the presence of sufficient water to cause dissolution of the potassium hydroxide. The strong aqueous base removes two protons from the metal-free phthalocyanine forming the di-anion. Simultaneously, the potassium ion complexes with the diglyme, forming a cationic complex characterized by having two diglyme units linked to one potassium cation. The phthalocyanine di-anion combines with two potassium-diglyme cations to form a salt which is soluble in an excess of diglyme. The solubility of the complex potassium-diglyme-phthalocyanine salt is temperature-dependent, i.e., there is higher solubility at elevated temperature and lower solubility in a chilled medium. Thus, when the materials are dissolved at about 80°–100° C., a high concentration of the desired salt will be contained in the diglyme phase. The diglyme phase may then be filtered hot to separate undissolved impurities. Upon cooling the crystalline complex salt separates and may be collected by filtration. Impurity species more soluble in the cooled diglyme phase remain in solution and are, thus, separated from the product. The indicated process may be repeated until the desired product purity has been achieved.

An alternate process for purification avoids the necessity for isolation of the complex diglyme-potassium-phthalocyanine salt. Thus, a hot solution is formed as described above, the solution is filtered and a quantity of water is added. Water donates protons to the phthalocyanine di-anion and, upon this protonation, the metal-free phthalocyanine is formed and obtained in crystalline form. Separation from insoluble and more soluble impurities is thus achieved. The purification may be repeated as often as desired.

Generally thus the methods for preparing some of the above described compositions involve causing a dissolving of prepurified metal free phthalocyanines, or metal free phthalocyanines containing impurities in a mixture of bis(methoxyethyl) ether with potassium hydroxide and water to form the potassium diglyme phthalocyanine material and if desired, further adding water to precipitate a purified metal free crystalline phthalocyanine. The potassium diglyme phthalocyanine is an isolatable compound as is the crown ether. However, the non-insulatable potassium compound can be used for paint pigments for example or for converting it to a purified phthalocyanine by recrystallizing as mentioned above. The phthalocyanine that results does not contain the impurities associated with the preparation of phthalocyanine from the acid pasting method and such phthalocyanine can be used in xerographic environments rather effectively. As a general sequence, the process for preparing a purified metal free phthalocyanine involves converting such phthalocyanine into a soluble form by contacting the phthalocyanine with a treating composition comprising bis(methoxyethyl) ether under basic conditions in a potassium metal hydroxide such as in the presence of a small amount of water followed by crystallizing the phthalocyanine in a pure form out of the resulting ether solution by quenching with water at an acidic pH, filtering, and repeating the above steps as desired to effect the required degree of purity. The phthalocyanine thus formed, in addition to having the above described properties, produces purified phthalocyanine which has suitable and desirable photoelectric properties and thus are useful as organic photoreceptors and possibly solar energy conversion devices.

The parameters of the process excepting for the reactants are not critical except that the base strength of the aqueous potassium hydroxide should be at least initially represented by 60 parts KOH and 40 parts water mixture, thus, both ionizable hydrogen atoms are withdrawn from the metal-free phthalocyanine and one complex salt of the invention may form in the presence of a suitable ligand such as diglyme. The amount of diglyme used in the process is not critical, as long as it is present in at least twice the molar quantity of the phthalocyanine. For pracctical purposes and when the ligand is a relatively inexpensive solvent such as diglyme, a large excess of ligand may be used in lieu of another solvent.

Alternatively, water may be omitted from the reaction altogether, a slight excess of ligand may be comined with dry potassium hydroxide pellets and dry phthalocyanine in a solvent such as benzene, toluene, 2-butanone and the like. Reaction times in this latter process may be larger, as the molecular contact between reacting species depends on solid to solid contact.

In order to obtain other phthalocyanine glyme ethers, or phthalocyanine crown ethers, similar procedures can be used with the exception that the appropriate ether is used in place of the bis(methoxy ethyl) ether. Such ethers would include for example a tetraglyme, 18-crown-6, 15-crown-5, and 12-crown-4 ethers.

The exact mechanism by which the metal free phthalocyanine is dissolved is not certain, however, it is believed that the potassium hydroxide diglyme mixture results in a potassium complex with two molecules of diglyme states similar to that of metal complexed crown ethers. The strong potassium hydroxide probably ionizes the phthalocyanine such that the di-anion is formed per molecular phthalocyanine unit. In combination thus, the two effects would result in a charge separated salt of phthalocyanine which may dissolve in organic solvents similar to the crown ether salts of other ions. In this regard, the visible light absorption spectrum of the green phthalocyanine product indicates a single peak at 663 mm in diglyme. Addition of a few drops of water to the diglyme solvent generates a blue solution with two equal intense spectral peaks at 653 mm and 688 mm. Allowing for differences in concentration the molecular extinction coefficient of the green form is at least twice that of the blue form which indicates a high degree of molar association for the blue form. The same diglyme and crown complexes were generated by reaction of preformed dipotassium phthalocyanine with the respective ligands. Several other potential ligands such as dimethyl sulfoxide and dimethyl formamide reacted readily with dipotassium phthalocyanine, forming crystalline derivatives, the structures of which were determined to be similar to those of the diglyme/crown species.

The impurities present in the phthalocyanine prepared from conventional means causes electrical conduction in the dark for instance which would not make such phthalocyanines useful as a photoconductor particularly organic photoconductors in electrophotographic systems. With the process of the present invention, this disadvantage is eliminated since the undesirable impurities are removed.

The invention will now be described in detail with respect to specific preferred embodiments thereof, it being understood that these Examples are intended to be illustrative only and the invention is not intended to be limited to the materials, conditions, process parameters, etc., recited herein. All parts and percentages are by weight unless otherwise indicated.

EXAMPLE I

Preparation of Dipotassium ($K_2$) Phthalocyanine Bis-Diglyme from KOH

In an 800 milliliter flask, 5 grams potassium hydroxide (KOH), KOH, 6 milliliters de-ionized water, 75 milliliters diglyme (commercially available from Aldrich Chemical Company) and 2.5 grams phthalocyanine were combined. The mixture was stirred and heated (80° C.) for 15 minutes. The hot solution was then filtered through a medium fritted funnel, and 400 milliliters acetone was added to the filtrate. The highly reflective crystals which had formed were collected after 5 hours, washed with 200 milliliters acetone, and dried in the vacuum dessicator. The product was placed in vials under $N_2$. The product was identified by single crystal X-ray diffraction as being dipotassium phthalocyanine-bis-diglyme.

EXAMPLE II

Preparation of Dipotassium ($K_2$) Phthalocyanine (18-crown-6) from Potassium Hydroxide KOH In a 125 milliliter Erlenmeyer flask, 5 grams of KOH was placed in 25 milliliters of benzene and 5 milliliters of de-ionized water. The mixture was stirred and heated until all the KOH had gone into solution. Shortly thereafter, 750 mg. 18-crown-6 ether (commercially available from Aldrich Chemical Company) and 1.0 grams phthalocyanine were then added to the warm solution, and the solution was stirred overnight. The following morning the green solution was placed in a 50 milliliter graduate cylinder and covered with a layer of dry octane. After one week of slow diffusion/crystallization, the crystals were filtered through a fine fritted funnel and dried by pulling dry $N_2$ through them for 5 minutes. The product was placed into vials under $N_2$. The product was identified by single crystal X-ray diffraction as being dipotassium phthalocyanine bis (18-crown-6) ether.

EXAMPLE III

Preparation of $K_2$ Phthalocyanine Tetraglyme from $K_2$ Phthalocyanine

In a 125 milliliter ground glass Erlenmeyer, 500 mg. $K_2$ phthalocyanine was added to 50 milliliters Tetraglyme. The mixture was stirred and warmed at about 60° C. for 1 hour. A green solution resulted, with some undissolved material apparent by visual observation. The solution was filtered while hot through a fine fritted funnel.

To the green filtrate was added 5 milliliters of potassium hydroxide-ethyl alcohol mixture (KOH/$C_2H_5OH$). A small amount of green microcrystalline material precipitated from this solution.

This material was collected in a fine fritted funnel after 48 hours, washed with petroleum ether at about 30° C. to 60° C. and dried in the vacuum dessiccator. The product was placed in vials under $N_2$. The product was identified by X-ray diffraction as being a dipotassium phthalocyanine tetraglyme.

EXAMPLE IV

Preparation of $K_2$ Phthalocyanine Tetraglyme from KOH

In an 800 milliliter Fleaker, 8.5 grams of KOH, 5.0 grams phthalocyanine, 150 milliliters Tetraglyme and 5 milliliters $H_2O$ were combined and stirred for 1 hour. Solid green material began precipitating 5 minutes after addition of phthalocyanine and continued to precipitate for at least 30 minutes.

After the solution had stirred for one hour, the green precipitate was collected in a medium firtted funnel, washed with 100 milliliters petroleum ether at about 30° C. to 60° C. dried in the vacuum dessiccator. The product was placed into vials under $N_2$. The product was identified by X-ray diffraction as being a dipotassium phthalocyanine tetraglyme.

EXAMPLE V

Preparation of $K_2$ Phthalocyanine Dimethyl Sulfoxide

In a ground glass 50 milliliter Erlenmeyer, 500 milligrams $K_2$ phthalocyanine was placed in 5 milliliters dimethyl sulfoxide and heated to boiling. The hot solution was filtered through a medium fritted funnel, and the filtrate transferred to a second 50 milliliters ground glass Erlenmeyer, stoppered, and allowed to cool to room temperatures.

The crystalline reflective material which has formed in cooling was collected in a medium fritted funnel, washed with 25 milliliters of carbon tetrachloride ($CCl_4$), and dried in the vacuum dessiccator. The product was placed in vials under $N_2$. The product was identified by X-ray diffraction as dipotassium phthalocyanine dimethyl sulfoxide.

EXAMPLE VI

Preparation of $K_2$ Phthalocyanine/Dimethyl Formamide

In a 50 milliliter ground glass Erlenmeyer, 1.5 grams $K_2$ phthalocyanine was added to 20 milliliters dimethyl formamide. The mixture was heated to boiling. The hot solution was transferred to a second 50 milliliter ground glass Erlenmeyer, stoppered, and allowed to cool to room temperature.

The crystalline material which formed in cooling was collected in a medium fritted funnel. The highly reflective purple crystals were initially washed with a mixture of heptane/dimethyl formamide (0:1), and subsequently with 100 milliliters heptane. The highly reflective product was then dried in the vacuum dessiccator. The product was placed in vials under $N_2$. The product was identified by single X-ray diffraction as dipotassium phthalocyanine dimethyl formamide.

EXAMPLE VII

Preparation of $K_2$ Phthalocyanine Bis (15-crown-5) from Potassium Hydroxide KOH In a 125 milliliter Erlenmeyer, 1.25 grams of potassium hydroxide KOH was dissolved in 1 milliliter de-ionized water. To this solution was added 15 milliliters benzene, 12.5 milliliters 15-crown-5 ether (commercially available from Aldrich Chemical Company) and 0.5 gram of phthalocyanine. After 5 minutes, the volume was brought up to 100 milliliters with benzene. The solution was allowed to stir for 1 hour.

The solution was then dried with magnesium sulfate $Mg_2SO_4$, filtered, and the filtrate placed in a crystallizing dish covered with Kimwipe and a cover glass. The needle-like crystals which formed were collected after 18 hours in a medium fritted funnel and dried in the vacuum desiccator. The product was placed in vials under $N_2$. The product was identified by X-ray diffraction as being dipotassium phthalocyanine bis (15-crown-5) ether.

EXAMPLE VIII

Preparation of Dipotassium ($K_2$) Phthalocyanine Bis (15 crown-5) from $K_2$ Phthalocyanine In a 50 milliliter Erlenmeyer, 1.0 grams of $K_2$ phthalocyanine, 10 milliliters benzene and 10 milliliters of a 15-crown-5 ether (commercially available from Aldrich Chemical Company) were combined and stirred for one hour. The green solution was then filtered, and to the filtrate was added 200 milliliters benzene. The solution is then placed in a crystallizing dish in a dessiccator and covered with a Kimwipe and a cover glass. Slow evaporation of the benzene produced needle-like green crystals. These were filtered through a medium fritted funnel, washed with a small amount of benzene, and dried in the vacuum dessiccator. The product was placed in vials under $N_2$. The product was identified by X-ray diffraction as being dipotassium phthalocyanine bis (15-crown-5) ether.

EXAMPLE IX

Preparation of $K_2$ Phthalocyanine Bis-Diglyme from $K_2$ Phthalocyanine

In a 125 milliliter Erlenmeyer, 1 gram $K_2$ phthalocyanine was placed in 40 milliliters 2-methoxyethyl ether (commercially available from Aldrich Chemical Company). The mixture was stirred for 72 hours and subsequently filtered through a fine (4–5.5$\mu$) fritted funnel. The filtrant appeared blue and reflective.

To the clear, green filtrate was added 100 milliliters dry acetone. Highly reflective crystals began precipitating immediately upon its addition. After 24 hours the needle-like crystals were collected by vacuum filtration and washed with dry acetone until the filtrate appeared colorless. Care was taken to avoid pulling air through the moisture-sensitive crystals.

The highly reflective, needle-like crystals were then transferred to a vacuum desiccator and pumped on overnight. The product was placed in vials under dry $N_2$ the following morning. The product was identified by X-ray diffraction as being dipotassium phthalocyanine bis diglyme.

PHTHALOCYANINE PURIFICATION

In one method, 200 to 400 grams of several samples of phthalocyanines were prepared followed by subjecting 30 to 50 grams quantities of these phthalocyanines to a solution purification process, (acid pasting, followed by potassium hydroxide diglyme recrystallization) thus resulting in approximately five samples which can be used for electrical comparisons. The phthalocyanine was initially made by the acid pasting method described hereinbefore followed by a potassium hydroxide diglyme crystallization followed by acid pasting. More specifically (Step 1) the potassium diglyme process involves mixing together in an 800 milliliter Fleaker on a hotplate 400 milliliters of diglyme, 40 grams of potassium hydroxide and 25 milliliters of water. This mixture was heated and stirred gently so as to result in a two-phase system to which was added 20 grams of metal free phthalocyanine. Continued stirring and heating to approximately 60° to 80° C. was accomplished until a clear green solution resulted, which solution was allowed to settle. Subsequently the upper green phase of the solution was filtered through a sintered glass funnel.

There was then added to the warm filtrate with stirring 50 milliliters of water and the entire mass is then allowed to settle into a pasting suspension. There was then collected the solids on a 10 to 15 micron 600 milliliters sindered glass funnel followed by washing with acetone. The initial filtrate is green and acetone washes out the brownish yellow matter. The product is purple brown in color and appears crystalline.

After drying on the filter, it is removed and there is added to this product 400 milliliters of diglyme, 40 grams of potassium hydroxide and 25 milliliters of water. Additionally 50 milliliters of water are added to cause precipitation which is collected and washed with acetone as mentioned above. This step was repeated with the exception that the acetone wash is omitted, as there is some danger of acetone condensation products at a high pH.

The dissolution as described in Step 1 above was repeated and there was collected after filtration a purple brown product. The filtrate was poured with stirring into a stirred mixture of 1,200 milliliters of water and 300 milliliters of concentrated hydrochloric acid. A blue suspension resulted, which was heated to a boil and allowed to remain at a boiling phase for about 30 minutes. The solid resulting was collected, washed with de-ionized water, about 500 milliliters, and then with acetone. The collected solid was then again suspended in 2½ gallons of water containing approximately 100 milliliters of concentrated hydrochloric acid and stirred overnight. It was allowed to stand overnight and thereafter the phthalocyanine was settled, most of the water decanted and the remaining suspension filtered. The resuspension sequence with 2½ gallons of water was repeated three more times. This resulted in a blue colloid in water which was discarded. After final settling in the 200 milliliter cylinder the solid was collected on a fritt, washed with 500 milliliters of acetone at least two times, and dried at 40° C. in a vacuum. The yield was 13.9 grams of alpha free metal phthalocyanine identified by X-ray powder pattern.

PHOTORECEPTOR PREPARATION

A photoelectric charge generator composition was prepared by placing 0.3 gram of phthalocyanine pigment, 1.5 grams of poly-N-vinylcarbazole, 120 grams of ⅛ inch steel shot and 30 milliliters of benzene into a 2 ounce glass bottle and ball-milling the composite for about 90 hours. The resulting pigment/polymer suspension was coated over a hole transport layer (N,N$^1$-diphenyl-N,N'-bis(methyl phenyl)-[1,1-biphenyl]-4,4' diamine in Makrolon) using a 2 mil gap setting in a multiple clearance film applicator from Gardner Laboratories, Inc.

The layers were dried in air, then in a vacuum oven at 50° C. to remove residual solvent and found to be 1-2 microns thick, the exact thickness being dependent upon a number of factors including viscosity of the coating solution, temperature of coating and such. The photoreceptor devices were kept in the dark overnight or longer as desired before electrical measurements were undertaken.

ELECTRICAL PROPERTIES

To evaluate the electrical properties of a purified phthalocyanine material, a series of photoreceptor samples, all prepared as described above, were compared. Since the only known variant between samples was their phthalocyanine pigment content, the measured electrical properties are taken as an expression of pigment electrical properties.

In order, the following manipulations and measurements were performed:

(1) The dark rested devices were charged by a positive corona in the dark.

(2) The surface charge was measured by any suitable electrostatic voltmeter. Typical charges were found to be in the range of 700–1600 volts.

(3) The loss of voltage in the dark (dark decay) was measured as a function of time. Since it is known that such dark decay depends on the electric field, measurements were normalized by expressing dark decay as a satisfactory performance in a xerographic copier, it is generally desirable to hold the dark decay to a few percent per second, the exact number desired being influenced by the cycling rate of the photoreceptor.

(4) The photoreceptor was then exposed to discharge light to reduce surface voltage to zero and the charge, dark decay, photodischarge cycle repeated several times. Finally, in this representative test, the photoreceptor was exposed to bright room light for five minutes and the measurement cycle repeated to give the "light fatigued" dark decay. In order to operate in a cycling copier mode, it is desirable that there by as little change as possible between the first and later imaging cycles and especially, that the photoreceptor not show an undue enhancement of dark decay upon exposure to bright light.

The results of a typical pigment purification are contained in Table 1.

Table 1

| | Pigment | Dark Discharge in % of initial charge per second | Light-Fatigued Dark Discharge in % per second |
|---|---|---|---|
| A. | Crude Synthetic Metal-free phthalocyanine | 29.2% | 41.9% |
| B. | Sample A after a single step diglyme purification, water wash only | 14.3% | 19.1% |
| C. | Sample B with additional dilute hydrochloric acid wash, then water wash | 3.13% | 6.66% |
| D. | Sample A using four-step di-glyme purification, dilute hydrochloric acid and water wash | 2.24% | 4.79% |

It is evident by inspection of Table 1 that progressive improvement of electrical properties has occurred by the method described. The pigment of sample A caused the photoreceptor to discharge nearly one third of applied voltage in one second, an unacceptable level for operation of a copying device. In stages, the described pigment purification resulted in a photoreceptor that had ten times less photodischarge in the dark. Sample D has sufficiently low dark decay of applied charge both in the dark-rested and the photofatigued state to be useful as a xerographic photoreceptor.

ALTERNATE PHTHALOCYANINE PURIFICATION

Since the exact nature of undesirable contaminants in phthalocyanine is not known, it was determined if the traditional acid pasting and the new diglyme method would remove separate contaminants and if the sequential application of both methods would produce a product better than that obtained by using each method separately. Acid pasting of phthalocyanine involved dissolution of the pigment in cold, concentrated sulfuric acid and quenching of the solution with ice and water, followed by exhaustive washing with distilled water. The process and several variants are described and referenced in "Phthalocyanine Compounds" by F. H. Moser and A. L. Thomas, Reinhold Publishing Corporation, New York, N.Y. 1963, pages 153–157).

In order to determine if any purification effect was additive and independent between the two methods, an experimental procedure was selected where both possible sequences were used: acid pasting followed by diglyme and diglyme followed by acid pasting. The results are illustrated in Table 2:

Table 2

| | Pigment | Light-fatigued dark discharge in % per second |
|---|---|---|
| E. | In-house synthetic metal-free phthalocyanine pre-purified | 2.8% |
| F. | Acid pasted (E) | 2.18% |
| G. | Diglyme purified (F) | 1.75% |
| H. | Acid pasted (G) | 1.22% |
| I. | Diglyme purified (E) | 1.52% |
| K. | Acid pasted (I) | 0.88% |

The experiments summarized in Table 2 demonstrate that an unusual degree of purification can be attained by combined use of both purification methods.

Other modifications of the present invention will occur to those skilled in the art upon a reading of the present disclosure. These are intended to be included within the scope of this invention.

What is claimed is:

1. The composition dipotassium phthalocyanine bis(methoxy ethyl)ether.

2. The composition phthalocyanine bis(methoxy ethyl)ether of the empirical formula $C_{44}H_{44}H_8O_6K_2$.

3. A process for the preparation of dipotassium phthalocyanine bis(methoxy ethyl)ether which comprises heating a metal free phthalocyanine with 60 parts by weight of potassium hydroxide and 40 parts by weight of water with bis(methoxy ethyl)ether which is present in at least twice the molar quantity of the metal free phthalocyanine, whereby the potassium hydroxide is dissolved, and subsequently filtering the hot solution, followed by cooling the solution to about room temperature, and separating from the mixture the product dipotassium phthalocyanine bis(methoxy ethyl)ether.

4. A process in accordance with claim 3 wherein the product obtained is phthalocyanine bis(methoxy ethyl)ether of the empirical formula $C_{44}H_{44}N_8O_6K_2$.

5. A process for the preparation of purified phthalocyanine which comprises reacting metal free phthalocyanine containing impurities with 60 parts by weight of potassium hydroxide, and 40 parts by weight of water, and bis(methoxy ethyl)ether wherein the ether is present in at least twice the molar quantity of the phthalocyanine, thereby causing dissolution of the potassium hydroxide, followed by filtering, and the addition of further water whereby a purified metal phthalocyanine is formed and isolated.

* * * * *